(No Model.)

R. C. FAY.
PLOW.

No. 562,814. Patented June 30, 1896.

Witnesses:
T. J. Klossowski
M. Sibbour

Inventor:-
Richard C. Fay

UNITED STATES PATENT OFFICE.

RICHARD C. FAY, OF SOUTH BEND, INDIANA.

PLOW.

SPECIFICATION forming part of Letters Patent No. 562,814, dated June 30, 1896.

Application filed July 29, 1895. Serial No. 557,466. (No model.)

*To all whom it may concern:*

Be it known that I, RICHARD C. FAY, a citizen of the United States, residing at South Bend, in the county of St. Joseph and State of Indiana, have invented Improvements in Moldboards for Plows, which are fully set forth in the following specification and illustrated in the accompanying drawings, which show its construction, in which—

Figure 1:
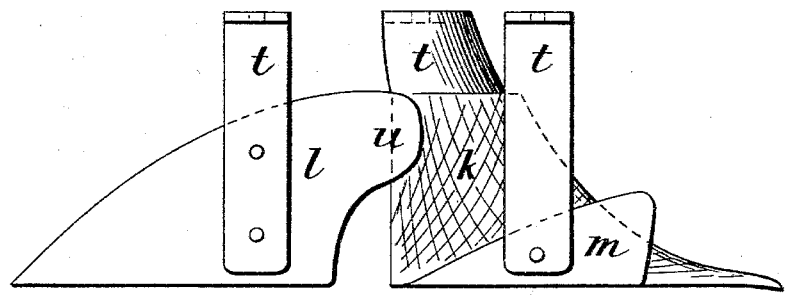
Figure 2:
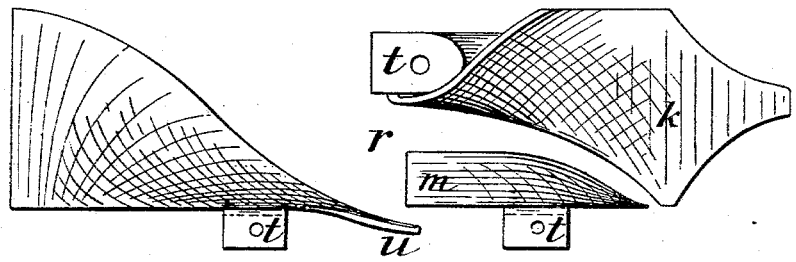
Figure 3:
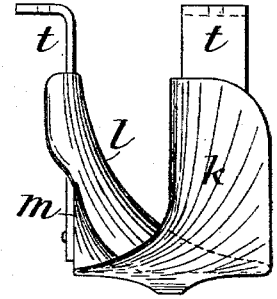

Figure 1 is a side view. Fig. 2 is a plan. Fig. 3 is a front view.

Similar letters refer to similar parts throughout the several views.

My invention consists of moldboards for a plow, so arranged as to cut up a furrow-slice, turn it over, and replace it in the furrow in the rear of the plow, the object being to obtain smooth plowing in turning over sod and stubble and to replace the furrow-slice in the furrow from which it is cut.

For its construction two moldboards $k$ and $l$ are placed one in front of the other, one right and one left, with sufficient distance between them to allow free passage of the furrow-slice, and at the side of the moldboard $k$ an auxiliary moldboard $m$ is placed. The moldboard $k$ turns spirally from its horizontal share in front to a vertical position at or near the center of the width of the plow. The auxiliary moldboard $m$ (at the side of the moldboard $k$) turns spirally from its vertical position in front to a horizontal position in the rear, at or near the point where the moldboard $k$ terminates. The rear moldboard $l$, with projections $u$ in front, turns spirally from its vertical position in front to a horizontal position in the rear. These moldboards will be fitted with suitable standards $t$ and plow beam or frame. These plows will be made rights and lefts, to be used single, double, or in gangs.

Manner of operating: As the moldboards $k$, $m$, and $l$ pass under the furrow-slice it is lifted up. The under or soil side comes in contact with the moldboard $k$. At the same time the side of the furrow-slice slides over and is directed by the auxiliary moldboard $m$, and, with the combined action of the moldboard $k$ and auxiliary moldboard $m$, the furrow-slice is lifted to a vertical position at $r$. Then the grass or stubble side of the furrow-slice comes in contact with the face of the moldboard $l$, which slides under it and lays it down in the furrow in the rear of the plow, having turned the furrow-slice upside down in the furrow.

To prevent the furrow-slice from turning out of its course, the projection $u$ is placed in front of the moldboard $l$, of which it forms a part.

Having described my invention, what I claim, and desire to secure by Letters Patent, is—

1. The moldboard $k$, for a plow, turning spirally from the horizontal share in front to a vertical position in or near the center of the width of the plow, and at its side an auxiliary moldboard $m$, turning spirally from its vertical position in front to a horizontal position in the rear, substantially as described and shown for the purpose specified.

2. The moldboard $l$, for a plow (in the rear of and combined with the moldboard $k$), turning spirally from its vertical position in front to a horizontal position in the rear, substantially as described and shown for the purpose specified.

3. The moldboard $k$, with the auxiliary moldboard $m$, in combination with the moldboard $l$, (with projection $u$,) in the rear of the moldboard $k$, substantially as described and shown for the purpose specified.

RICHARD C. FAY.

Witnesses:
LOUISE HANAUER,
EVA LEMERS CLARKE.